United States Patent [19]

Okano et al.

[11] Patent Number: 4,707,100
[45] Date of Patent: Nov. 17, 1987

[54] DEVICE FOR LOCKING THE OPERATION RING OF PHOTOGRAPHING LENS

[75] Inventors: Hiroshi Okano, Tokyo; Hideo Kanno, Chiba; Sachio Ohmori, Yokosuka, all of Japan

[73] Assignee: Nippon Kogaku K.K., Tokyo, Japan

[21] Appl. No.: 936,628

[22] Filed: Dec. 1, 1986

[30] Foreign Application Priority Data

Dec. 10, 1985 [JP] Japan .......................... 60-190000[U]

[51] Int. Cl.4 .......................... G03B 9/02; G03B 17/00
[52] U.S. Cl. .................................. 354/273; 354/289.11
[58] Field of Search ......... 354/195.1, 289.11, 270-273

[56] References Cited

U.S. PATENT DOCUMENTS 2,878,738   3/1959   Uhland ............................ 354/270
4,110,769   8/1978   Schütz et al. .................... 354/195.1
4,341,450   7/1982   Shigoku ............................. 354/273
4,408,499  10/1983   Haneishi ..................... 354/289.11 X
4,518,238   5/1985   Hama ................................. 354/270

Primary Examiner—Donald A. Griffin
Attorney, Agent, or Firm—Shapiro and Shapiro

[57] ABSTRACT

In a photographing lens barrel having a manual operation ring and a stationary ring, a device for locking said manual operation ring is provided. The locking device includes a lock member projecting from one of said two rings, a lock part formed on the other ring to engage with said lock member, and a lock-operating member movable between a lock position and an unlock position. The lock operating member is biased toward said locking position by spring means and is held in said unlock position by limiting means.

5 Claims, 9 Drawing Figures

DEVICE FOR LOCKING THE OPERATION RING OF PHOTOGRAPHING LENS

BACKGROUND OF THE INVENTION

1. Field of the Invention

The present invention relates to a device for locking the manual operation ring for exposure control on a photographing lens. More particularly, the present invention is directed to such locking device capable of locking the manual operation ring at a determined position for the change-over between manual control mode and automatic control mode.

2. Related Background Art

In a known photographing lens provided with a manual operation ring, the exposure control mode is changed over from manual mode to automatic mode when the manual operation ring is moved to a certain determined position. At this particular set position, a locking device is actuated to lock the manual operation ring against further rotation. In the art, there have been known various locking means for this purpose.

In a typical example of the photographing lens with an aperture-presetting ring, a locking device is provided on a stationary ring opposed to the aperture-presetting ring. In the automatic aperture control mode including shutter time priority automatic exposure control mode, programmed automatic exposure control mode etc., the operator presets the aperture-presetting ring in the position for minimum aperture value. The locking device locks the presetting ring against any accidental rotation of the presetting ring.

In a known construction, the locking device is so formed that it can be actuated automatically when the aperture-presetting ring has just been rotated to a predetermined lock position indicated by a mark. The lock position mark is at a point a little forward beyond the minimum aperture value position of the presetting ring. This known construction has some drawbacks. Firstly, a particular mark indicating the minimum aperture value position for aperture control mode is needed in addition to the mark indicating the lock position. Secondly, the aperture-presetting ring has to be moved over a larger rotational angle which is inconvenient to the user of the camera.

In another known photographing lens, the locking device is so formed that it can be actuated automatically at once when the aperture-presetting ring reaches the position for minimum aperture value. However, the use of the known locking means limits the freedom of aperture selection in other exposure control modes than the automatic aperture control mode. For example, in the manual exposure control mode in which the operator can manually set the aperture to any desired value, or in the aperture priority automatic exposure control mode, there may occur such case where the operator wishes to change the aperture from minimum aperture value to another value. But, the known locking device inhibits such a selection of aperture value because the aperture-presetting ring has already been locked in the position for the minimum aperture value in this case.

To overcome the drawback of the known locking means as mentioned above, a solution has been proposed, for example, by the invention of U.S. Pat. No. 4,341,450 (patented on July 27, 1982). According to the known solution, a slidable lock member with a projection is provided on any one of the stationary ring and the aperture-presetting ring. The lock member is mounted for manual slide-movement in the direction along the optical axis.

In a predetermined position on the other ring, there is formed a recess in which the above-mentioned projection is engageable. The aperture-presetting ring can be locked only when the projection gets in engagement with the recess by the operator's moving the lock member. The important disadvantage of this known solution is found in that the manual operation required for locking is complicate and takes a long time. The reason for this is that the operator has to rotate at first the preset ring up to the position in which the projection and the recess are opposed to each other, and then to move the lock member in the direction along the optical axis in order to establish the locking engagement.

SUMMARY OF THE INVENTION

Accordingly, it is an object of the present invention to solve the problems involved in the prior art devices as mentioned above and to provide a locking device which is able to automatically lock the operation ring of a photographing lens at a predetermined position when the locking is desired.

It is another object of the invention to provide a locking device which is simple in construction and reliable in operation and with which the locking and unlocking of the operation ring can be performed promptly without failure.

To attain the objects, the present invention provides a photographing lens with an improved locking device comprising locking means and lock-operating means.

The photographing lens according to the invention has a manual operation ring mounted for rotation about the optical axis of the lens and a stationary ring adjacent to the operation ring and fixed with the center of the ring on the optical axis of the lens. A lock member is provided on one of the two rings, that is, on the manual operation ring or on the stationary ring. The lock member projects toward the other ring and is mounted radially movable for engagement with a corresponding locking part formed on the other ring. Furthermore, a lock operation member is provided on the same ring as the lock member is provided. The lock operation member passes through the ring radially and is connectable with the lock member for rotation with the latter. The lock operation member is movable between locking and unlocking positions. In the locking position, the lock operation member allows the lock member to come into engagement with the locking part on the other ring. In the unlocking position, the lock operation member disengages the lock member from the locking part. The lock operation member is normally biased, together with the lock member, toward the locking position by spring means. The direction in which the lock operation member can be moved is limited by limiting means which serves to hold the lock operation member in the unlocking position.

With the above construction according to the present invention, a person can easily select any desired one of automatic lock and non-automatic lock. When the automatic lock is selected, the manual operation member is automatically locked in the above-mentioned particular position. On the contrary, when the non-automatic lock is selected, the manual operation member can not automatically be locked. In the non-automatic lock position, that is, in the unlocking position of the lock operation member, the operation of the manual operation member is limited to prevent it from being carelessly operated. Therefore, there is no fear that the locking device may unintentionally be actuated thereby losing a good shutter chance.

The locking device according to the present invention may be incorporated into an ordinary photographing lens with aperture-presetting means as later shown in a preferred embodiment of the invention, bringing forth the following advantages over the prior art ones:

It is no longer necessary to particularly provide a set position for minimum aperture value to be used for aperture control.

The locking mechanism can be automatically effective at the position for minimum aperture value. Therefore, the members otherwise required for it can be omitted.

Since the aperture-presetting ring can not always be locked automatically at the position for minimum aperture value, the locking device never interferes with the operation for setting the aperture to any desired value from the minimum aperture value.

Other and further objects, features and advantages of the invention will appear more fully from the following description taken in connection with the accompanying drawings.

DESCRIPTION OF THE PREFERRED EMBODIMENT

Figure 1:
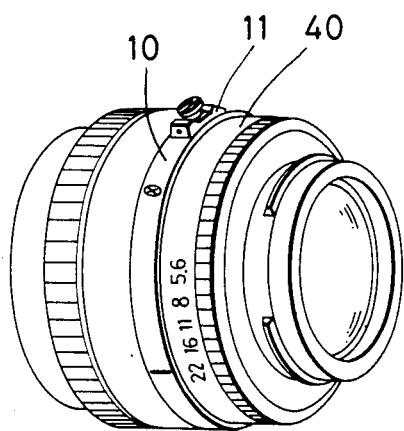
FIG. 1 is a perspective view of a photographing lens with an aperture-presetting ring showing an embodiment of the invention.

Referring first to FIG. 1 there is shown a photographing objective lens as an embodiment of the present invention. The photographing lens is an interchangeable lens having two adjacent rings 10 and 40 on the circumferential surface. The ring 10 is a stationary ring fixed on the circumferential surface. The ring 40 is an aperture-presetting ring mounted for rotation about the optical axis of the lens.

Figure 2:
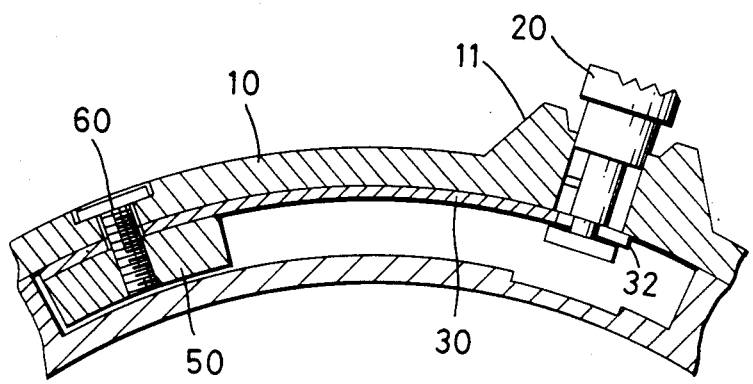
FIG. 2 is an enlarged sectional view of the locking mechanism part provided on a stationary ring of the embodiment shown in FIG. 1.
Figure 3:
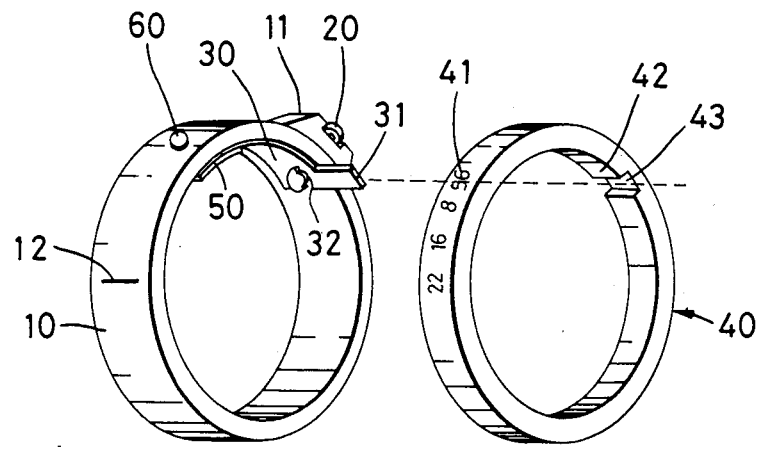
FIG. 3 is a perspective view of the aperture-presetting ring shown in FIG. 1 and the stationary ring having the locking mechanism shown in FIG. 2.

The stationary ring 10 has a lock holder 11 for holding an operation button 20 and a lock plate 30 as shown in FIG. 2. The operation button 20 and the lock plate 30 constitute a locking mechanism. The lock plate functions as a leaf spring and one end of the lock plate is fixed by a washer 50 and a screw 60. At the other end, the locking plate 30 is connected to the operation button. As seen best in FIG. 3, the locking plate 30 has a lock portion 31 projecting toward the aperture-presetting ring 40 from the stationary ring 10. The stationary ring 10 has a mark 12 in opposition to a scale of aperture values on the presetting ring 40.

To receive the lock portion 31 of the lock plate 30 the aperture-presetting ring 40 has a groove 43 formed on the inside surface of the ring.

Figure 4:
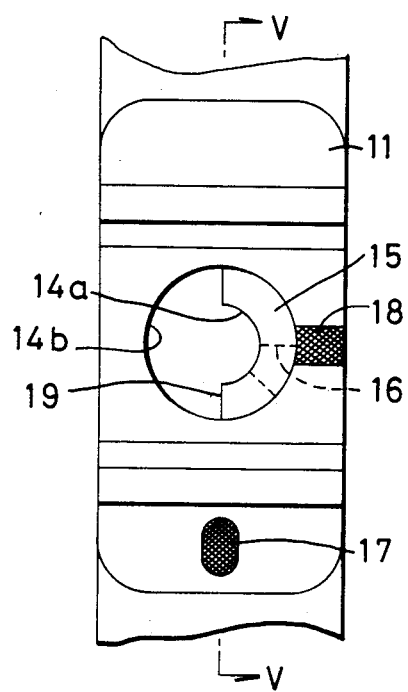
FIG. 4 is a plan view of a circumferential part of the stationary ring shown in FIG. 2.
Figure 5:
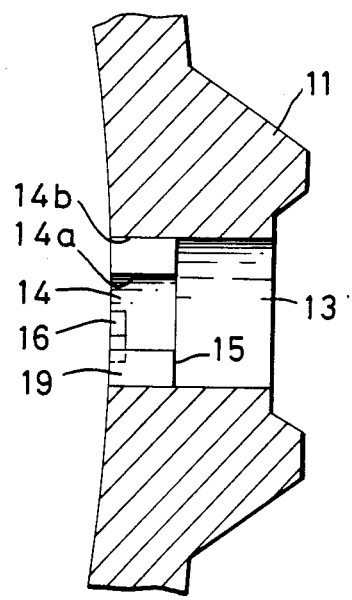
FIG. 5 is a sectional view thereof taken along the line V—V in FIG. 4.

The structure of the lock holder part 11 of the stationary ring 10 is shown in detail in FIGS. 4 and 5. FIG. 4 is a plan view thereof and FIG. 5 is a sectional view taken along V—V.

Figure 6A:
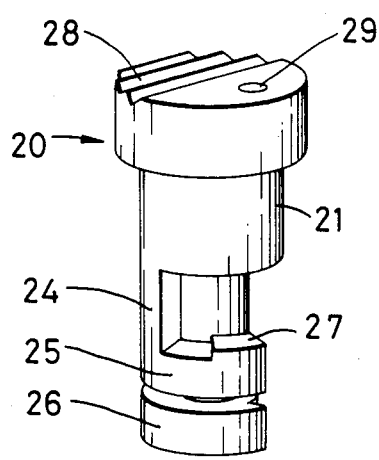
FIG. 6A is a perspective view of the lock operation button shown in FIG. 2.

Referring to FIGS. 4 and 5, the lock holder 11 has a first through-hole 13 and a second through-hole 14 with a stepped portion 15 therebetween. The first through-hole 13 is cylindrical. The second through-hole 14 is composed of a semicylindrical surface 14a and a semicircular hole 14b. The diameter of the semicylindrical surface 14a is smaller than that of the through-hole 13 whereas the diameter of the semicircular hole 14b is equal to that of the through-hole 13. The operation button 20 (see FIG. 6) can be inserted into the through-holes 13 and 14 and can be rotated therein. A segment groove 16 is formed on the inner wall of the through-hole 14. To indicate the angular positions for locking and for unlocking of the operation button 20, a lock position mark 17 and an unlock position mark 18 are provided on the lock holder 11.

Figure 6B:
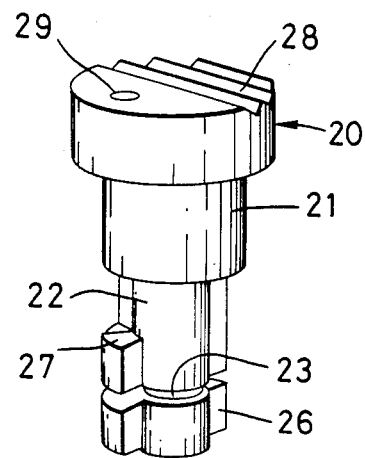
FIG. 6B is a similar perspective view to FIG. 6A, but looking from another side.

As shown in FIG. 6, the operation button 20 has a first shank portion 21 to be fitted in the through-hole 13, a second shank portion 22 to be fitted in the semicircular hole part 14b and an engaging portion 23 to be engaged in a groove-like cutout 32 formed in the free end of the lock plate 30.

Furthermore, the operation button 20 has two rotation-limiting portions 24 and 25 and a lock plate-holding portion 26. The rotation-limiting portion 24 is formed under the first shank portion 21 to limit the rotation angle of the operation button 20. The rotation-limiting portion 24 is in the form of a sector of an angle of 90 degrees and fitted to the semicylindrical surface 14a of the through-hole 14. The second rotation-limiting portion 25 is under the second shank portion 22 and is in the form of a semicylinder of 180 degrees corresponding to the semicircular hole 14b of the through-hole 14b. The rotation-limiting portion 25 has a pawl-like projection 27 which can engage in the groove 16 on the lock holder 11.

On the head of the button 20, a series of ridges are formed to prevent the slip of the operator's finger from the button. Also, on the button head, there is an alignment mark 29 to be aligned to the above-mentioned lock mark 17 or unlock mark 18 on the holder part 11.

Between the first shank portion 21 and the rotation-limiting portion 25 there is provided a cutout portion which allows the rotation of the operation button 20.

As previously shown in FIG. 2, the operation button is inserted into the through-holes 13 and 14 of the lock holder 11 and then used in the following manner:

Normally, the operation button 20 is in the position for inhibiting any unintentional actuation of the locking mechanism on the stationary ring 10 during the rotation of the aperture-presetting ring 40. To this end, the operator at first depresses the operation button 20 down against the spring force of the lock plate 30 and then rotates the button until the mark 20 is aligned with the unlock mark 18 on the stationary ring 10 as shown in FIG. 7B.

Figure 7A:
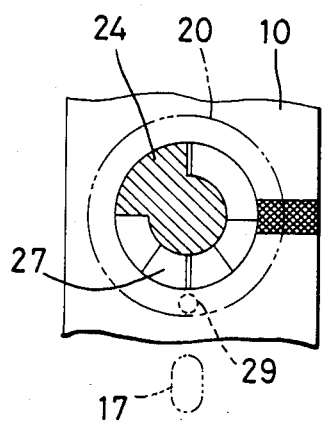
FIGS. 7A and 7B are plan views illustrating the relationship between the hook portion of the lock operation button and the step portion for locking on the stationary ring, FIG. 7A showing it in the locked position and FIG. 7B in the unlocked position.
Figure 7B:
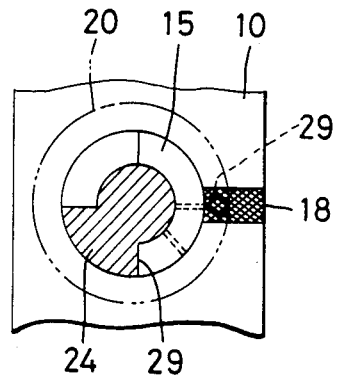

In this position, as seen in FIG. 7B, the bottom of the first shank portion 21 (FIG. 6A) is in contact with the stepped portion 15 of the first through-hole 13 (FIG. 5). The rotation-limiting portion 24 is abutting on the side wall 19 of the second through-hole 14. Thus, no further rotation of the operation button is allowed. Under the spring force of the lock plate 30, the pawl-like projection 27 engages in the groove 16 to hold the operation button in the position. In this position, since the lock plate 30 has been pushed down against its spring force by the operation button, the lock portion 31 projecting in the direction along the optical axis from the stationary ring 10 can not engage in the lock groove 43 even when the aperture-presetting ring 40 is rotated to a desired aperture value. Thus, in this position, the aperture-presetting ring 40 can not be locked by the locking mechanism.

When the aperture control mode is selected, the operator has to set the aperture-presetting ring 40 to the position for minimum aperture value and then hold the ring in the position. Therefore, it is necessary to turn the lock plate 30 to the lock position from the above-mentioned unlock position.

To this end, the operator rotates the operation button 20 clockwisely from the position previously shown in FIG. 7B to the lock position as shown in FIG. 7A in which the mark 29 on the button head is in alignment with the lock position mark 17. However, in the unlock position shown in FIG. 7B, it is not possible at once to rotate the operation button 20 clockwisely to the lock position because the pawl-like projection 27 is in engagement with the groove 16 under the spring force of the lock plate 30 as previously mentioned.

Therefore, the operator at first pushes down the operation button 20 to disengage the pawl-like projection 27 from the groove 16 on the stationary ring 10. Thereafter, the operator rotates the operation button clockwisely from the unlock position mark 18 to the lock position mark 17. In the position shown in FIG. 7A in which the mark 29 on the button is in alignment with the lock position mark 17 on the holder, the rotation-limiting portion 25 of the button 20 is in the through-hole 14 and, therefore, the operation button is allowed to be pushed up by the spring force of the lock plate 30.

Thus, the operation button is returned to the position shown in FIG. 2. In this position, the lock portion 31 is in contact with the inside surface 42 of the aperture-presetting ring 40. When the aperture-presetting ring is rotated by the operator, the lock portion 31 is slided on the inside surface 42 of the ring 40. When the ring 40 reaches just the position for minimum aperture value, the lock portion 31 engages in the groove 43 under the spring force of the lock plate 30. In this manner, the aperture-presetting ring 40 is locked in the minimum aperture value position.

As will be understood from the foregoing, so long as the operation button 20 is in the unlock position by depression, the lock portion 31 never engages in the groove 43. Therefore, the aperture-presetting ring 40 can be rotated freely to any desired aperture value. In this position, the engagement of the pawl-like projection 27 in the groove-like cutout 16 prevents any unintentional rotation of the operation button from the unlock position to the lock position.

The locking mechanism can be actuated only when the operation button is in the lock position.

In the lock position, the lock portion 31 is urged into contact with the inside surface 42 of the ring 40 by the spring force of lock plate. As soon as the ring 40 has been rotated to the position for minimum aperture value, the lock portion 31 falls in the groove 43 to lock the ring 40 in the position.

In the above embodiment, the mark indicating the minimum aperture value on the aperture-presetting ring 40 is commonly used to the indications of the minimum aperture value in the manual exposure control mode and of the set position in the aperture control, automatic exposure control mode. Therefore, it is no longer necessary to provide a particular mark indicating the set position for minimum aperture value in the automatic aperture control mode on the aperture-presetting ring. In the automatic aperture control mode, the locking of the aperture-presetting ring can be selected at one's will in a simple manner by changing over the operation position of the lock operation button. This construction according to the present invention brings about many advantages. A smaller rotation angle is required for the aperture-presetting ring. The size of the cam required for the aperture-presetting ring can be reduced accordingly. A further simplification of the internal structure of the lens tube can be realized.

While the invention has been particularly shown and described with reference to a preferred embodiment thereof, it will be understood that various modifications may be made therein without departing from the sprit and scope of the invention.

For example, while the groove 43 has been formed on the aperture-presetting ring and the holder 11, the operation 20 and the lock plate 30 have been provided on the stationary ring in the above embodiment, it is also possible to provide the lock operation button and the lock plate on the aperture-presetting ring while providing the lock groove in the stationary ring.

We claim:

1. In a photographing lens tube having a manual operation ring mounted for rotation about the optical axis of the lens and a stationary ring disposed adjacent to the manual operation ring and fixed with its center on the optical axis, a locking device for locking said manual operation ring in a predetermined position comprising:
   a lock member projecting from one of said two rings to the other ring and movable in radial direction;
   a lock part formed on the other ring for engagement with said lock member;
   a lock-operating member movable between two positions, that is, a lock position in which it can be rotatably connected with said lock member passing through said one ring and can move radially to bring said lock member and lock part into engagement, and an unlock position in which it can disengage said lock member from said lock part;
   spring means for biasing said lock-operating member together with said lock member toward said lock position; and
   limiting means for holding said lock-operating member in said unlock position and limiting the return motion toward said lock position.

2. A locking device according to claim 1, wherein said spring means is an arculate leaf spring extending along the inside surface of said one ring and having, at its free end, said lock member integrally formed with it.

3. A locking device according to claim 1, wherein said one ring has a circular hole which said lock-operating member can be fitted into and a semicircular hole formed by a step portion to inhibit the rotation of said lock-operating member and wherein said lock-operating member has a cylindrical portion to be fitted into said circular hole, a semicylindrical portion to be fitted into said semicircular hole and a groove-like cutout formed between said cylindrical and semicylindrical portions to allows said operating member to rotate when it has been moved to said unlock position.

4. A locking device according to claim 3, wherein said limiting means comprises a projected step portion which axially projects from one end surface of said semicylindrical portion of the lock-operating member when the latter is rotated, and a groove portion which said projected step portion engages in, said groove portion being formed on one end surface of the step portion by which said semicircular hole is formed, and wherein said limiting means allows said lock-operating member to move to said lock position when said operating member is rotated in a determined direction after said projected step portion has been disengaged from said groove against the biasing force of said spring means.

5. A locking device according to claim 4, wherein said one ring has two marks provided on the outer circumference surrounding the lock-operating member, one of said two marks being a mark indicating the lock position and the other mark indicating the unlock position and wherein on the end surface of said lock-operating member there is provided a mark which is to be aligned with one of said two position marks when said operating member is rotated.

* * * * *